(12) United States Patent
Kim et al.

(10) Patent No.: US 7,312,837 B2
(45) Date of Patent: Dec. 25, 2007

(54) LIQUID CRYSTAL DISPLAY DEVICE WITH TOUCH PANEL

(75) Inventors: Hong Jin Kim, Kyongsangbuk-do (KR); In Yong Yoo, Daegu-kwangyokshi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 293 days.

(21) Appl. No.: 10/952,634

(22) Filed: Sep. 29, 2004

(65) Prior Publication Data
US 2005/0094039 A1    May 5, 2005

(30) Foreign Application Priority Data
Oct. 31, 2003    (KR) ............... 10-2003-0076758

(51) Int. Cl.
G02F 1/1335    (2006.01)
(52) U.S. Cl. .................. 349/12; 349/58; 362/632
(58) Field of Classification Search ............ 349/12, 349/65, 58, 64, 16, 187; 362/632–634
See application file for complete search history.

(56) References Cited

U.S. PATENT DOCUMENTS 4,846,694 A * 7/1989 Erhardt ................. 434/365
6,309,100 B1 * 10/2001 Lutnaes ................. 374/183
6,456,343 B2 * 9/2002 Kim et al. .............. 349/58
6,556,258 B1 * 4/2003 Yoshida et al. ........ 349/61
2002/0109803 A1 * 8/2002 Yu et al. ................ 349/58

FOREIGN PATENT DOCUMENTS

JP    10-073805    3/1998
JP    14-214586    7/2002

* cited by examiner

Primary Examiner—Thoi V. Duong
(74) Attorney, Agent, or Firm—Brinks Hofer Gilson & Lione

(57) ABSTRACT

An LCD device with a touch panel includes an LCD panel displaying images; a backlight unit provided below the LCD panel; an electronic graphic input panel (EGIP) film provided on the LCD panel; and a case extending toward a lower side of the LCD panel. The case extends toward the lower side of the LCD panel, without overlapping the EGIP film, to encase the LCD panel and the backlight unit. The EGIP film has planar dimensions which are greater than planar dimensions of the LCD panel.

31 Claims, 4 Drawing Sheets

LIQUID CRYSTAL DISPLAY DEVICE WITH TOUCH PANEL

PRIORITY CLAIM

This application claims the benefit of the Korean Application No. P2003-76758 filed on Oct. 31, 2003, which is hereby incorporated by reference.

BACKGROUND

1. Technical Field

The present application relates to a liquid crystal display (LCD) device, and more particularly, a liquid crystal display (LCD) device with a touch panel, which may be suitable for a notebook computer requiring mechanical compactness or other display applications.

2. Related Art

A liquid crystal display (LCD) device includes an LCD panel having lower and upper glass substrates and a liquid crystal layer formed between the substrates. A polarizing plate polarizes light at both sides of the LCD panel. A light source provides uniform light to the LCD panel. A light-guiding plate guides light into the LCD panel. The LCD device displays video signals inputted from an external source.

The lower glass substrate includes a plurality of gate lines arranged along a first direction at fixed intervals, a plurality of data lines arranged along a second direction at fixed intervals perpendicular to the first direction, a plurality of pixel electrodes arranged in a matrix-type configuration within pixel regions P defined by crossing of the gate and data lines, and a plurality of thin film transistors T enabled according to gate pulse signals supplied to the gate lines for transmitting data signals from the data lines to the pixel electrodes. The upper glass substrate includes a black matrix layer that prevents light from reaching portions of the lower substrate except the pixel regions P, an R/G/B color filter layer for displaying various colors, and a common electrode for applying an electric field to the liquid crystal layer in conjunction with the pixel electrodes. In this LCD device, the lower and upper substrates are bonded to each other at a predetermined interval, and the liquid crystal layer is formed between the lower and upper substrates.

An EGIP (electric graphic input panel) may be mounted to the LCD device. The EGIP permits viewing of the images on a screen through the EGIP, and simultaneously permits operator input to a related electronic device. In the LCD device provided with the EGIP touch panel, it is possible to display video signals on the LCD device and to input data on a screen of the LCD device simultaneously without an additional keyboard or mouse.

FIG. 1 is an exploded perspective view of a typical liquid crystal module (LCM) and FIG. 2 is a partial cross sectional view of the LCM taken along lines A-A in FIG. 1. The LCM includes an LCD panel 10 displaying images, a polarizer (POL) 40, a backlight unit 19 formed at the rear of the LCD panel 10 to provide light, light-scattering means 20 provided between the backlight unit 19 and the LCD panel 10 to scatter light emitted from the backlight unit 19 and to provide uniform light to an entire surface of the LCD panel, and a top case 30 to connect the LCD panel 10 with the backlight unit 19. The light-scattering means 20 is comprised of lower and upper light-diffusion sheets 26 and 29, and lower and upper prism sheets 27 and 28.

The backlight unit 19 includes a fluorescent lamp 22 emitting light, a light-guiding plate 24 to guide the light emitted from the fluorescent lamp 22 to the LCD panel 10, a metal reflective plate 23 surrounding the fluorescent lamp 22 to condense the light emitted from the fluorescent lamp 22 on the light-guiding plate 24, a reflective sheet 25 provided below the light-guiding plate 24 to condense the emitted light on the LCD panel 10, and a synthetic resin molded frame 21 having a rectangular shape for supporting respective components.

FIG. 3 is a cross sectional view of an EGIP film. The EGIP film includes upper and lower PET (polyethylene terephtalate) films 1 and 2, transparent electrodes 3 and 4, an adhesive 8, a PVA (polyvinyl alcohol) film 5, a TAC (triacetyl cellulose) film 6, and a silver layer 7. The silver layer 7 may comprise, for example, silver, (Ag), gold (Au) and/or any other conductive material(s). The transparent electrodes 3 and 4 are formed on opposing surfaces of the two PET films 1 and 2, and the two PET films 1 and 2 are bonded to each other in a non-display area which is provided in the circumference of the lower and upper PET films 1 and 2, at a predetermined intervals therebetween by the adhesive 8. The PVA film 5 is formed below the lower PET film 2 for polarizing light, and the TAC film 6 is formed below the PVA film 5 for protecting the PVA film 5 from humidity. The silver layer 7 is formed on the upper PET film 1. The PVA film 5 and the TAC film 6 are referred to as a polarizer (POL), and the silver layer 7 and the upper and lower PET films 1 and 2 are referred to as an EGIP film.

FIG. 4 is a partial cross-sectional view of an LCD device taken along lines B-B of FIG. 1. The example LCD device illustrated in FIG. 4 includes a related art EGIP film 70. The LCD device includes an LCD panel 50, a backlight unit 59, light-scattering means 60, the EGIP film 70, and a top case 80. The LCD panel 50 includes lower and upper substrates, and a liquid crystal layer formed between the two substrates. Also, the backlight unit 59 is provided below the LCD panel 50 to emit light, and the light-scattering means 60 is provided between the LCD panel 50 and the backlight unit 59 to scatter the light emitted from the backlight unit 59. The EGIP film 70 is provided on the LCD panel 50 and the top case 80 is partially overlapped with both ends of the EGIP film 70. The top case 80 is provided to enclose the LCD panel 50 and the backlight unit 59.

The light-scattering means 60 is comprised of lower and upper light-diffusion sheets 61 and 62, and lower and upper prism sheets 63 and 64. The backlight unit 59 is comprised of a light-guiding plate 65, a reflective sheet 66, and a synthetic resin molded frame 67 of a rectilinear shape for supporting the respective components.

Except for the EGIP film 70, the LCD device has the same structure as that of a typical LCD display device. The EGIP film 70 is the same size as the upper substrate of the LCD panel 50 and is adhered to the LCD panel 50 by an adhesive layer 71.

The top case 80 is curved at a right angle so that the top case 80 is formed as a rectangular band shape having a flat side and a lateral side covering the edge of the EGIP film 70. The lateral side of the top case 80 has a screw hole for penetration of a screw 90. The screw 90 serves to fasten the backlight unit 59 to the top case 80.

FIG. 5 is a partial cross sectional view of the EGIP film 70 mounted on the LCD panel 50 in FIG. 4. The LCD panel 50 has a display area (active area) and a non-display area (non-active area), and an upper polarizing plate 72 is formed on the LCD panel 50. Then, transparent electrodes (not shown in FIG. 5, and referred to as '3' and '4' in FIG. 3) are formed on opposing surfaces of lower and upper PET films 73 and 74. The lower and upper PET films 73 and 74 are bonded to each other at their perimeter in the non-display area, by double-sided adhesive tapes 76 and 77. Also, an FPC 75 is provided to apply voltages VDD and GND to the transparent electrodes, and to output voltages which vary according to the contact point of the transparent electrodes when an external force is applied.

Reference 'A' is an in active area or non-touch area, and 'B' is an active area or a touch display area. Near the boundary between 'A' and 'B', there may be a failure to respond to a touch, whereas this problem does not arise in the portion of 'B' which is distant from 'A'.

However, the LCD device having the touch panel according to the related art has the following disadvantages:

In the LCD device having the touch panel according to the related art, the top case covers the edge of the EGIP film, which serves as the touch panel. Thus, the LCD device has no problem in itself. However, it is difficult to repair the EGIP film if the EGIP film fails. That is, if the EGIP film fails, the EGIP film is repaired after separation of the top case, thereby complicating the repairing process.

Also, the edge of the EGIP film is designed in correspondence to the case and the outer size of the LCD panel, so that it is impossible to design the EGIP electrode adjacent to the touch display area. Accordingly, the edge of the EGIP film may fail in various ways.

SUMMARY

By way of introduction only, in one embodiment, a liquid crystal display (LCD) device with a touch panel includes an LCD panel displaying images, the LCD panel having a front surface facing the viewer and a rear side facing in the opposing direction; a backlight unit provided below the LCD panel, to emit light; an EGIP film provided on the LCD panel; and a case extending toward a lower side of the LCD panel, without being overlapped with the EGIP film, to encase the LCD panel and the backlight unit. The case is overlapped with the rear of the backlight unit, fastened to the backlight unit by a screw, and may be formed of a metal material. The EGIP film is larger than the LCD panel and is adhered to the LCD panel with an adhesive.

The backlight unit may include a light-guiding plate provided at the rear of the LCD panel; a light source provided at one side of the light-guiding plate, to emit light; a lamp housing fixing the light source, and condensing the light emitted from the light source on the light-guiding plate; a reflective plate provided at a lower side of the light-guiding plate, to reflect the light leaking at a side opposite the LCD panel; and a frame supporting the respective components and the LCD panel. The EGIP film may be larger than the LCD panel, so that the edge of the EGIP film is disposed on the molded frame and may be adhered to the LCD panel and the molded frame by an adhesive.

The LCD device may include light-scattering means provided between the LCD panel and the backlight unit, to scatter the light emitted from the backlight unit, and to provide uniform light to the LCD panel.

DETAILED DESCRIPTION

Figure 6:
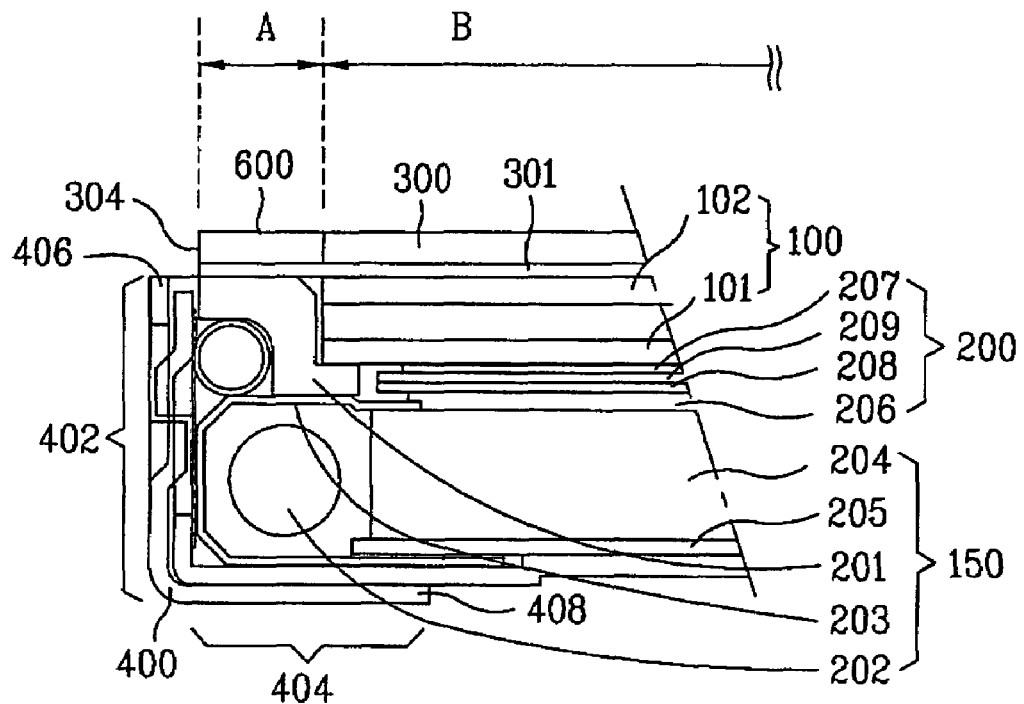
FIG. 6 is a partial cross-sectional view taken along lines A-A of FIG. 1 depicting an embodiment that includes an LCD provided with an a EGIP film.

Other features of the present apparatus will appear in the following description of an embodiment given by way of a non-limiting example, with reference to the drawings, in which the same elements or parts throughout the figures of the drawings are designated by the same reference characters FIG. 6 is a partial cross-sectional partial view taken along lines A-A in FIG. 1 of an embodiment of an LCD device provided with a touch panel. The LCD device may include an LCD panel 100, a backlight unit 150, light-scattering means 200, an EGIP film 300, and a case 400. The LCD panel 100 may include a rear surface that is a lower substrate 101 and a front surface that is an upper substrate 102. A liquid crystal layer may be formed between the two substrates 101 and 102, to display images. Also, the backlight unit 150 may be provided below the LCD panel 100, to emit light to the rear of the LCD panel 100. The light-scattering means 200 may be provided between the LCD panel 100 and the backlight unit 150, to scatter the light emitted from the backlight unit 150, and to provide uniform luminosity to the LCD panel 100. The EGIP film 300 may be provided on a front surface of the LCD panel 100. The case 400 extends toward a lower side of the LCD panel 100 and is partially overlapped with the edge of the backlight unit 150, to encase or surround the LCD panel 100 and the backlight unit 150. Accordingly, the LCD panel 100 and the backlight unit 150 are conterminously disposed within the case 400.

The backlight unit 150 may include a molded frame 201, a lamp 202, a metal reflective plate 203, a light-guiding plate 204, and a reflective sheet 205. The molded frame 201 may be formed of synthetic resin or some other rigid material capable of being formed in the desired shape, such as a rectangle or square. The lamp 202 may be provided at one end of the molded frame 201, to emit light. Alternatively, multiple lamps 202 may be positioned on the molded frame 201 at predetermined locations. The reflective plate 203, surrounding a portion of the lamp 202 at the end of the molded frame 201 having the lamp 202 may form a lamp housing. The lamp housing may reflect the light emitted from the lamp 202. The light-guiding plate 204 may be provided in the molded frame 201 in parallel with the lamp 202. The light-guiding plate 204 may guide the light emitted from the lamp 202 to the rear of the LCD panel 100. The reflective sheet 205 may be positioned below the light-guiding plate 204. The light-scattering means 200 may be comprised of lower and upper light-diffusion sheets 206 and 207 and lower and upper prism sheets 208 and 209 deposited on the light-guiding plate 204.

The case 400 may be a flange formed in a polygonal shape, such as a square or a rectangle. The case 400 includes a first member 402 that is a flat side or lip portion and a second member 404 that is a lateral side or base portion. The first member 402 may be disposed at a right angle (orthogonally) to the second member 404. The first and second members 402 and 404 of the case 400 may surround an edge of the backlight unit 150 and at least a portion of the rear side of the LCD panel 100. The case 400 may be formed of a metal material such as stainless steel.

In the example illustrated in FIG. 6, the first and second members 402 and 404 may be of single piece construction. Alternatively, two or more separate members may be coupled to form the case 400. The first member 402 may be a longitudinally extending wall formed in a first plane. The second member 404 may also be a longitudinally extending wall formed in a second plane. The first and second planes may orthogonally intersect to form an "L-shaped" carriage or flange in which the LCD panel 100, the backlight unit 150 and the light scattering means 200 may be disposed. Accordingly, the LCD panel 100, the backlight unit 150 and the light scattering means 200 may be positioned in respective planes that are substantially perpendicular with respect to the first member 402 and substantially parallel with respect to the second member 404.

The case 400 may include a first end 406 proximate a planar periphery of the EGIP film 300 and a second end 408 proximate the backlight unit 150. The first end 406 may be a flat planar surface that is coplanar with the upper substrate 102 of the LCD panel 100. Alternatively the first end 406 may be coplanar with a plane formed by the EGIP film 300. In other words, in different embodiments, the first member 402 may extend to end adjacent a planar edge of the LCD panel 100, a planar edge of the EGIP film 300 or any other location to support the LCD device. In addition, the first member 402 may extend to a rear side of the LCD panel 100 to orthogonally meet the second member 404.

Since the first member 402 remains in a plane substantially perpendicular to the EGIP film 300, the case 400 does not overlap or otherwise cover portions of the EGIP film 300. In other words, an edge 304 of the EGIP film 300 may be positioned adjacent an edge of the first end 406 of the case 400. Accordingly, no part of the case 400 overlies the EGIP film 300 and access to the EGIP film 300 is completely unobscured. Thus, the EGIP film 300 may be readily replaced, and failures of the EGIP film 300 may be minimized.

Figure 1:
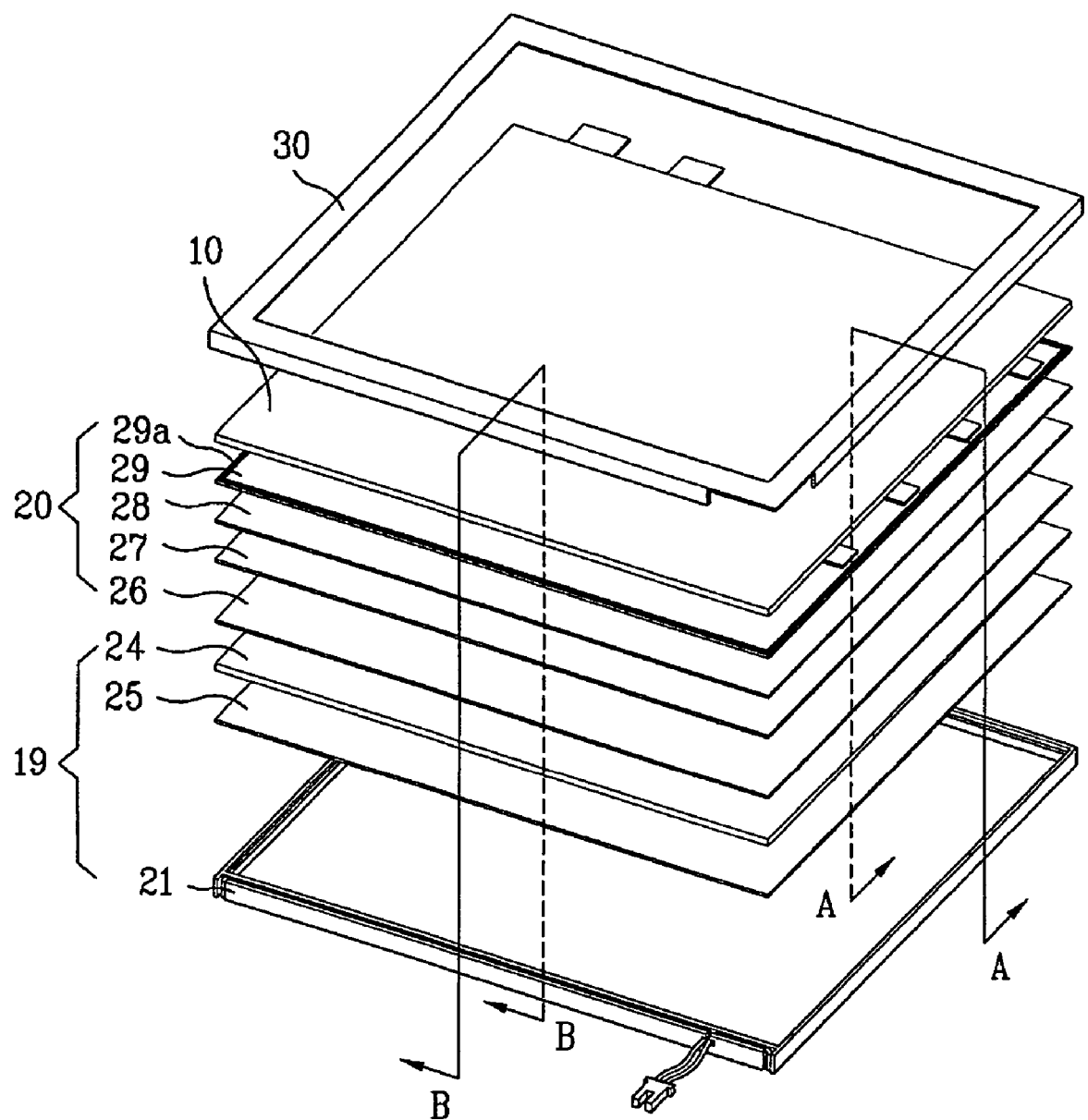
FIG. 1 is an exploded perspective view of a module of a typical LCD device.
Figure 2:
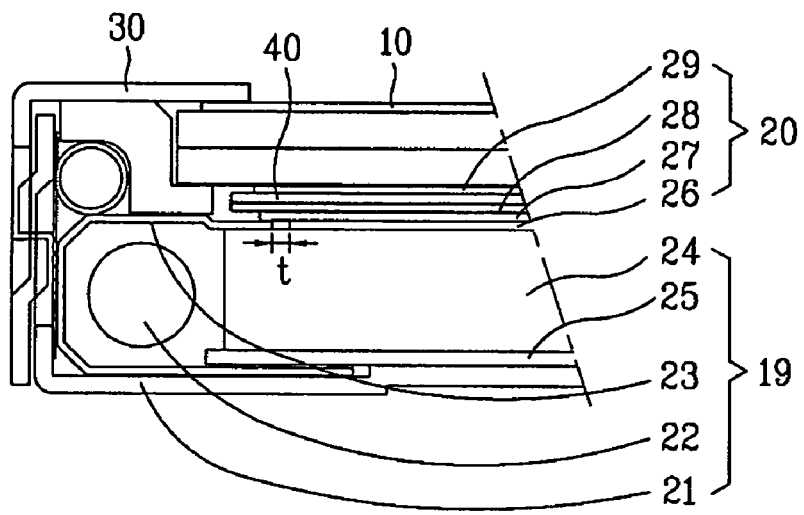
FIG. 2 is a partial cross-sectional view of a typical LCD device taken along lines A-A in FIG. 1.
Figure 3:
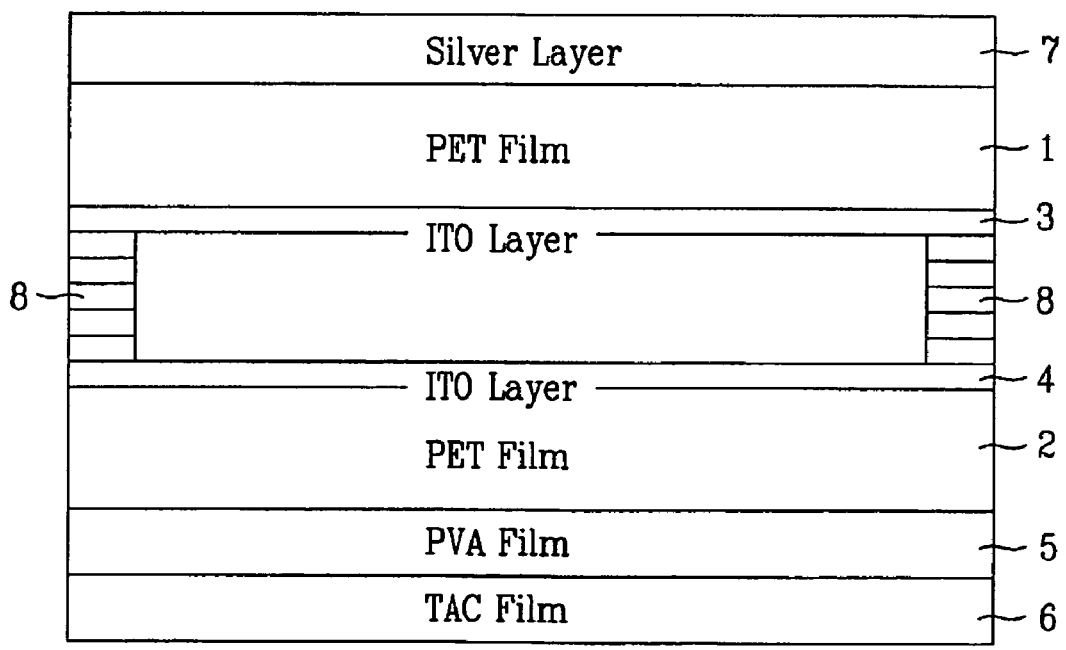
FIG. 3 is a partial cross-sectional view of a typical EGIP.
Figure 4:
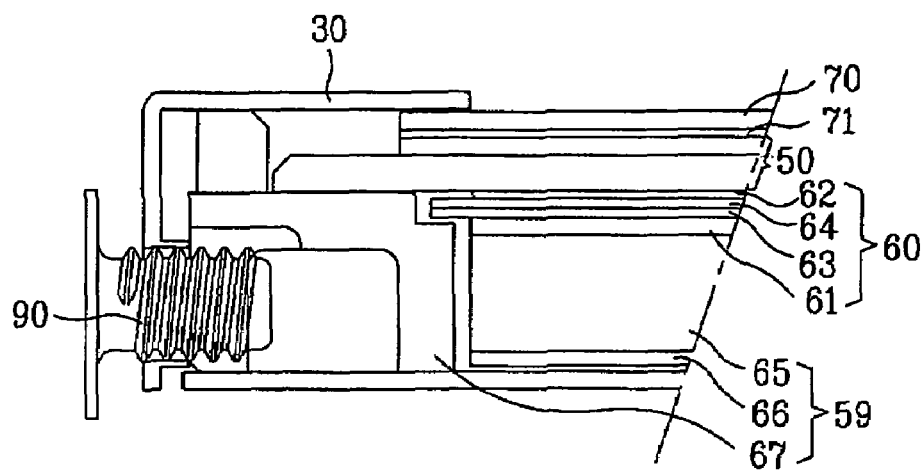
FIG. 4 is a partial cross-sectional view of a typical LCD device provided with a touch panel taken along lines B-B in FIG. 1.
Figure 5:
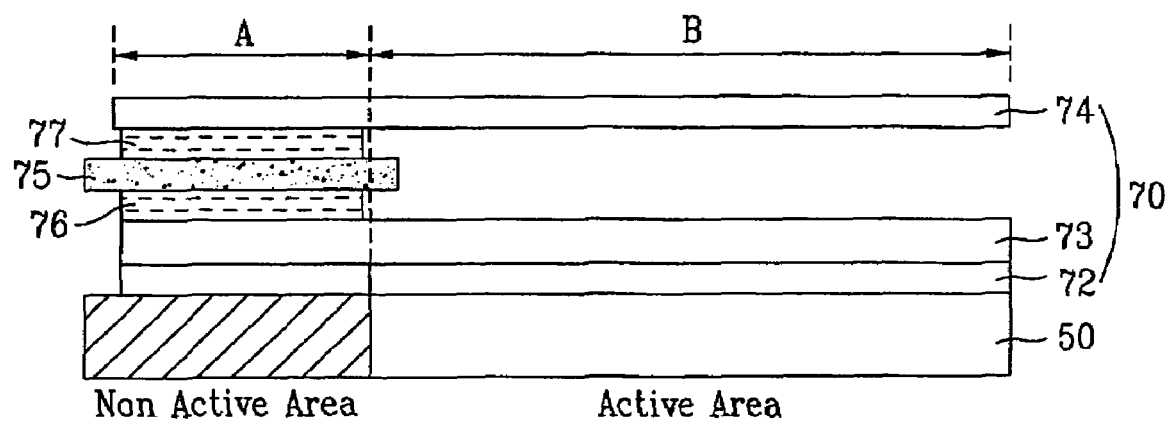
FIG. 5 is a partial cross-sectional view of an EGIP film provided on an LCD panel.
Figure 7:
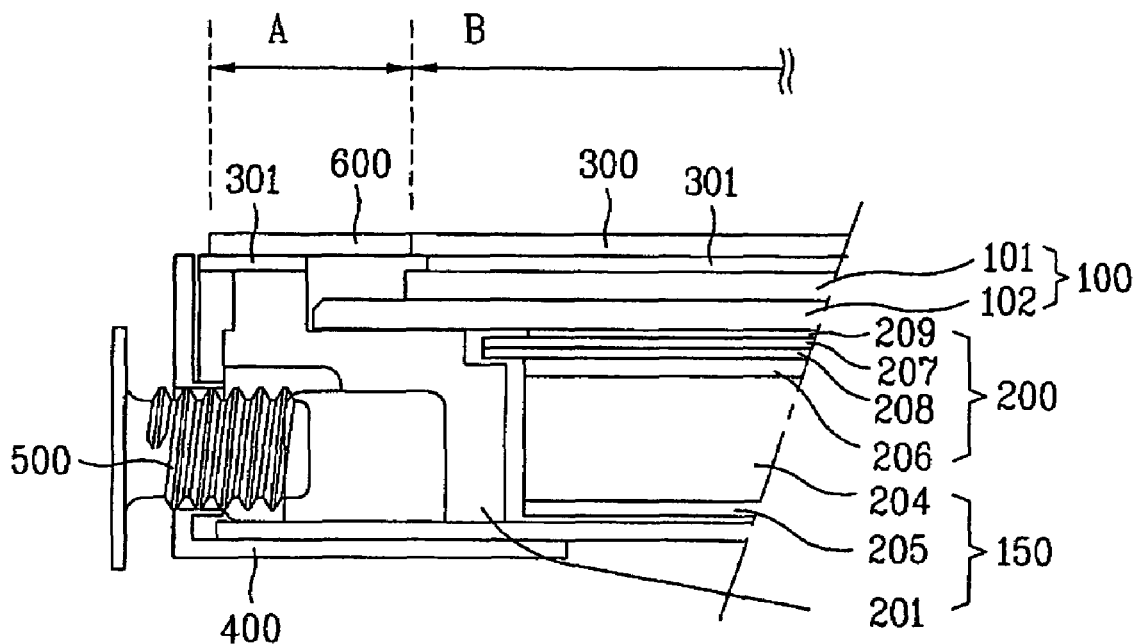
FIG. 7 is a partial cross-sectional view taken along lines B-B of FIG. 1 depicting an embodiment that includes an LCD provided with an EGIP film.

FIG. 7 is a partial cross-sectional partial view taken along lines B-B in FIG. 1 of an embodiment of an LCD device provided with a touch panel. The LCD device illustrates many components similar to those depicted in FIG. 6 and therefore, for purpose of brevity, discussion of these components will not be repeated. As further illustrated in FIG. 7, the case 400 is fastened to surround the edge of the molded frame 201 of the backlight unit 150. There is a screw hole in the lateral side of the case 400 for penetration of a screw 500 to fasten the case 400 to the molded frame 201. In other examples, any other fastening mechanism, such as a rivet, glue, welding, etc. may be used to couple the molded frame 201 and the case 400.

In LCD panel 100, liquid crystal is injected between the two glass substrates 101 and 102. Furthermore, the LCD panel 100 is comprised of liquid crystal cells arranged in a matrix having switching devices for switching signals provided to the liquid crystal cells.

Referring to both FIGS. 6 and 7, the EGIP film 300 is larger in planar dimension than the planar dimension of the LCD panel 100. This permits the EGIP film 300 to overlay onto the molded frame 201 of the backlight unit 150. The EGIP film 300 may be adhered to the upper substrate 102 of the LCD panel 100 and to the molded frame 201 by an adhesive 301. An electrode 600 may be included with the EGIP film 300. The electrode 600 may be separate from the active area or touch display area 'B', and may be included in the in-active area or non-touch area 'A'.

In this aspect, the case 400 is assembled to the rear of the LCD panel 100. Accordingly, the LCD device has a non-touch area 'A' of the EGIP film 300, which may include the electrode 600. The planar dimensions of the EGIP film 300 are larger than the planar dimensions of the LCD panel 100, such that the touch display area 'B' covers the LCD panel 100.

In another aspect, the backlight unit 150 may be comprised of a reflector and the molded frame 201, such that the backlight unit 150 reflects ambient light to illuminate the display.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display (LCD) device with a touch panel comprising:
    an LCD panel to display images, the LCD panel having a front surface and rear surface;
    an electronic graphic input panel (EGIP) film disposed in front of the front surface of the LCD panel; and
    a case extending toward a rear side of the LCD panel to surround the LCD panel, the case including a first end proximate to a planar periphery of the EGIP film, a first member formed in a plane that is substantially perpendicular with the LCD panel and the EGIP film, and a second member formed in a plane that is substantially parallel with the LCD panel and the EGIP film,
    wherein the first member substantially does not overlap the EGIP film, the first end substantiality does not extend toward upper side of the LCD panel, and the EGIP film is larger than the LCD panel.

2. The LCD device of claim 1, wherein the first member comprises a flat surface forming a plane substantially perpendicular with a plane formed by the EGIP film.

3. The LCD device of claim 1, wherein the case includes a longitudinally extending wall formed in a plane that is perpendicular to the LCD panel and the EGIP film, the wall having an edge that is proximate an edge of the EGIP film.

4. The LCD device of claim 1, wherein the case includes a longitudinally extending wall that forms a plane perpendicular with the LCD panel and the EGIP, the wall having an edge that is proximate a planar periphery of the front surface of the LCD panel.

5. The LCD device of claim 1, wherein the case is formed to include a first wall coupled perpendicularly with a second wall, wherein the first wall is formed to be perpendicular with the front face of the LCD panel and the second wall is formed to be parallel with the rear face of the LCD panel.

6. The LCD device of claim 1, wherein the case is a rectangular flange that is L shaped.

7. The LCD device of claim 1, further comprising the backlight unit disposed behind the rear surface of the LCD panel to emit light.

8. The LCD device of claim 7, wherein the backlight unit includes a front surface and a rear surface, the front surface adjacent to the rear surface of the LCD panel, and the case is overlapped with at least a portion of the rear surface of the backlight unit.

9. The LCD device of claim 7, wherein the case is fastened to the backlight unit by a screw.

10. The LCD device of claim 7, wherein the EGIP film includes an active area and an inactive area, and an electrode is disposed in the inactive area of the EGIP film.

11. The LCD device of claim 10, wherein the inactive area is attached to the backlight unit, and the active area is attached to the LCD panel, by an adhesive.

12. The LCD device of claim 7, wherein the EGIP film is attached to the LCD panel and to the backlight unit by an adhesive.

13. The LCD device of claim 7, wherein components of backlight unit include:
 a light-guiding plate provided at a surface side of the LCD panel opposite to the side facing the EGIP;
 a light source provided at a surface of the light-guiding plate, to emit light;
 a lamp housing containing the light source, and condensing the light emitted from the light source on the light-guiding plate;
 a reflective plate provided at a side of the light-guiding plate opposite to LCD panel, to reflect the light leaking from the light guiding plate; and
 a molded frame supporting the backlight components and coupled with the LCD panel.

14. The LCD device of claim 7, further comprising light-scattering means provided between the LCD panel and the backlight unit, to scatter the light emitted from the backlight unit, and to provide uniform light to the LCD panel.

15. The LCD device of claim 1, wherein the case is formed of a metal material.

16. The LCD device of claim 15, wherein the case is formed of stainless steel.

17. The LCD device of claim 1, wherein planar dimensions of the EGIP film are greater than dimensions of the LCD panel, such that a periphery of the EGIP film is contiguous with the case.

18. The LCD device of claim 1, further comprising a molded frame coupled with the case, wherein the EGIP film is attached to the LCD panel and to the molded frame by an adhesive.

19. The LCD device of claim 1, further comprising a backlight unit disposed behind the rear surface of the LCD panel to reflect light.

20. A method of assembling a LCD display, the method comprising:
 providing an LCD panel;
 applying an EGIP film over a surface of the LCD display, the EGIP film having at least an active and an inactive area, wherein the area of the EGIP film is larger than the area of the LCD panel;
 positioning a support frame to at least partially surround a planar periphery of the LCD panel;
 forming a case to have a first end proximate to a planar periphery of the EGIP film, a first member in a plane that is substantially perpendicular with the LCD panel and the EGIP film and a second member oriented orthogonally with respect to the first member, wherein the case is dimensioned to surround the LCD panel and the support frame, the first end substantially does not extend toward an upper side of the LCD panel, and the first member substantially does not overlap the EGIP film.

21. The method of claim 20, further comprising adhering the active region of the EGIP film to the LCD panel and the inactive region to the support frame.

22. The method of claim 20, wherein the support frame houses a backlight assembly.

23. A liquid crystal display (LCD) device with a touch panel comprising:
 an LCD panel for displaying images;
 an EGIP film attached to a surface of the LCD panel, the EGIP film being larger than the LCD panel;
 a support frame configured to engage the LCD panel opposite the EGIP film; and
 a case formed to surround at least a portion of a periphery of the LCD panel in a plane that remains substantially perpendicular with the LCD panel and the EGIP film, the case having a first end proximate to a planar periphery of the EGIP film,
 wherein the case substantially does not overlap the EGIP film in the periphery of the LCD panel in the plane that remains substantially perpendicular with the LCD panel and the EGIP film, and the first end substantially does not extend toward an upper side of the LCD panel.

24. The LCD device of claim 23, wherein the case includes a first member formed in a plane that is substantially perpendicular with the LCD panel and a second member formed in a plane that is substantially parallel with the LCD panel.

25. The LCD device of claim 23, wherein the case is configured to overlap with a rear surface of the LCD panel.

26. The LCD device of claim 23, wherein a coplanar area of the EGIP film is larger than a coplanar area of the LCD panel.

27. The LCD device of claim 23, wherein an electrode is disposed in an inactive area of the EGIP film.

28. The LCD device of claim 23, wherein an inactive area of the EGIP film is coupled with the support frame, and an active area of the EGIP film is coupled with the LCD panel.

29. The LCD device of claim 23, wherein the EGIP film is coupled with the LCD panel and the support frame by an adhesive.

30. The LCD device of claim 23, further comprising a light-scattering means provided behind a rear surface of the LCD panel opposite to the EGIP film to reflect ambient light incident on the EGIP film and the LCD panel.

31. The LCD device of claim 23, further comprising a backlight unit provided behind a rear surface of the LCD panel opposite the EGIP film to emit light through the EGIP and the LCD panel.

\* \* \* \* \*

UNITED STATES PATENT AND TRADEMARK OFFICE
CERTIFICATE OF CORRECTION

PATENT NO.        : 7,312,837 B2                                              Page 1 of 1
APPLICATION NO.   : 10/952634
DATED             : December 25, 2007
INVENTOR(S)       : Hong Jin Kim et al.

It is certified that error appears in the above-identified patent and that said Letters Patent is hereby corrected as shown below:

Column 6, in claim 1, line 16, after "extend toward" insert --an--.

Signed and Sealed this

Seventeenth Day of June, 2008

JON W. DUDAS
*Director of the United States Patent and Trademark Office*